United States Patent
Da Silva Carvalho et al.

(10) Patent No.: US 10,300,870 B2
(45) Date of Patent: May 28, 2019

(54) ENERGY HARVESTING DEVICE FOR A TRANSPORT VEHICLE

(71) Applicants: UNIVERSIDADE DO PORTO, Oporto (PT); ADDVOLT, S.A., Oporto (PT)

(72) Inventors: Adriano Da Silva Carvalho, Oporto (PT); Bruno Filipe Azevedo Costa, Oporto (PT); José Manuel Ferreira Duarte, Oporto (PT); José Ricardo Sousa Soares, Oporto (PT); Justino Miguel Neto De Sousa, Oporto (PT); Rodrigo Manuel Marinho Pires, Oporto (PT)

(73) Assignees: UNIVERSIDADE DO PORTO, Oporto (PT); ADDVOLT, S.A., Oporto (PT)

( * ) Notice: Subject to any disclaimer, the term of this patent is extended or adjusted under 35 U.S.C. 154(b) by 176 days.

(21) Appl. No.: 15/529,598

(22) PCT Filed: Nov. 25, 2015

(86) PCT No.: PCT/IB2015/059124
§ 371 (c)(1),
(2) Date: May 25, 2017

(87) PCT Pub. No.: WO2016/084017
PCT Pub. Date: Jun. 2, 2016

(65) Prior Publication Data
US 2017/0259764 A1   Sep. 14, 2017

(30) Foreign Application Priority Data
Nov. 25, 2014   (PT) .......................................... 108060

(51) Int. Cl.
*B60R 16/033* (2006.01)
*H02J 3/38* (2006.01)
(Continued)

(52) U.S. Cl.
CPC ............ *B60R 16/033* (2013.01); *B60K 17/28* (2013.01); *B60L 8/003* (2013.01); *H02J 3/383* (2013.01); *H02S 40/38* (2014.12); *Y02T 10/7083* (2013.01)

(58) Field of Classification Search
None
See application file for complete search history.

(56) References Cited

U.S. PATENT DOCUMENTS 7,338,335 B1   3/2008   Messano
8,723,344 B1   5/2014   Dierickx
(Continued)

OTHER PUBLICATIONS

International Search Report for International Patent Application No. PCT/IB2015/059124 dated Mar. 8, 2016. 3 pages.

*Primary Examiner* — Jared Fureman
*Assistant Examiner* — Aqeel H Bukhari
(74) *Attorney, Agent, or Firm* — Leason Ellis LLP (57) ABSTRACT

An energy harvesting device for a transport vehicle comprising an electric converter circuit and a power take-off unit is disclosed. The electric converter circuit comprises: an electric energy storage; a first DC bus; an electric generator connected to the first DC bus through an electronic brake controller; a second DC bus connected to the first DC bus through a DC/DC converter, and an inverter connected to the second DC bus and having an output connected to the electrical load of the energy harvesting device. The power take-off unit comprises: a rotatable pivot plate for coupling to the vehicle chassis and supporting the electric generator; an electric generator pulley coupled to the electric generator; a shaft pulley; a shaft attachment for attaching the shaft (Continued)

pulley to the vehicle driveline shaft; and a belt connecting the electric generator pulley and the shaft pulley.

18 Claims, 6 Drawing Sheets

(51) Int. Cl.
*H02S 40/38* (2014.01)
*B60K 17/28* (2006.01)
*B60L 8/00* (2006.01)

(56) References Cited

U.S. PATENT DOCUMENTS

| | | |
|---|---|---|
| 2006/0250902 A1 | 11/2006 | Bender et al. |
| 2007/0028958 A1 | 2/2007 | Retti |
| 2010/0108419 A1 | 5/2010 | Mari Curbelo et al. |
| 2011/0084648 A1 | 4/2011 | Cao et al. |
| 2011/0115605 A1* | 5/2011 | Dimig .................. B60L 1/00 340/5.61 |
| 2013/0231808 A1 | 9/2013 | Flath et al. |
| 2015/0128636 A1* | 5/2015 | McAlister .............. B01J 19/20 62/440 |
| 2016/0183467 A1* | 6/2016 | Goering .............. A01D 69/08 477/6 |

* cited by examiner

ENERGY HARVESTING DEVICE FOR A TRANSPORT VEHICLE

CROSS-REFERENCE TO RELATED APPLICATIONS

This application is a U.S. National Stage Application under 35 U.S.C. § 371 of International Patent Application No. PCT/IB2015/059124, filed Nov. 25, 2015, which claims priority to Portugal Application No. 108060, filed Nov. 25, 2014, which are hereby incorporated by reference in their respective entireties.

TECHNICAL FIELD

The disclosure relates to an energy harvesting system for a transport vehicle for supplying electricity to complementary electric systems in the vehicle (for instance, lights, refrigeration units, lift gates, air conditioning, garbage lifts, among others) and for reducing the load on the combustion engine, and thus increasing the environmental performance (both the level of noise and pollutant gas emissions) of the vehicle.

Technical Background

Photovoltaic panels are normally installed in the refrigerated vehicle roofs and are connected to a power converter, which in turn regulates the charging of the vehicle battery. The disadvantages of this are associated to the energy produced not being enough to supply more powerful loads like the refrigeration systems stated above.

The energy obtained from the photovoltaic panels is made available directly to the 24V battery which does not allow the delivery of this energy to the electric power grid and/or 3-phase loads. Furthermore, this energy it is not integrated with the batteries of the hybrid trucks with higher voltage.

There are also examples in the state of the art concerning hybrid trucks and/or hybrid gear boxes, which are equipped as standard, or alternatively require the replacement of the transmission chain from the engine to the shaft to incorporate the gear boxes available in the market.

SUMMARY

The energy harvesting device for transport vehicles aims at collecting the energy which these vehicles can capture, since they have a large kinetic and solar energy potentials.

The energy harvesting system comprises an electronic conversion device which integrates the solar production, regenerative braking and a hybrid plug-in electric energy storage system building an internal micro-grid.

This electronic conversion device manages the operation of an electric generator, integrated into a micro-grid. The electric generator is coupled to the vehicle mechanical shaft with a mechanical locking system which comprises a belt connected to a pulley that is coupled to the vehicle shaft through a shrink disc system. This way, the energy is harvested from braking and deceleration processes. The integration of the energy harvesting device does not compromise the braking safety neither is detrimental to the original systems.

A photovoltaic solar panel array can be integrated into the system and installed for example in the vehicle roof with maximum power point tracking and tracking control, being useful namely in conditions of high electric energy consumption. The integration is completed with a hybrid plug-in electric energy storage system based on an electrochemical battery and super-capacitors (UCs), which allow the electronic device conversion to respond efficiently to dynamic performance of different sources.

The electronic conversion device is responsible for managing power flows among these three processes—energy harvesting during vehicle braking and deceleration, solar energy generation and also energy storing—to supply auxiliary systems in such way that energy is provided according to vehicle service requirements. The photovoltaic solar panel energy together with the electric energy storage are sufficient to give autonomy for parking (no power from movement of the vehicle) with complementary systems running. The electronic conversion device is to be installed in heavy and medium duty vehicles and allows to supply AC or DC electric loads (for instance, electronic drive systems, lights, refrigeration units, lift gates, air-conditioning, garbage lifts and external electric loads, for example, the electric grid). The presently disclosure is particularly useful for high-current loads, like refrigeration units, in particular those devices requiring a three-phase supply, e.g. 380/400 V 50/60 Hz.

The present disclosure comprises an energy harvesting device for a transport vehicle with a driveline shaft comprising an electric converter circuit and a power take-off unit, wherein the electric converter circuit comprises: an electric energy storage comprising an electrochemical battery and a super-capacitor bank; a first DC bus; an electric generator connected to the first DC bus, through an electronic brake controller; a second DC bus connected to the first DC bus through a DC/DC converter, wherein the first DC bus voltage is lower than the second DC bus voltage; an inverter, wherein the inverter input is connected to the second DC bus and the inverter output is connected to the electrical load of the energy harvesting; and wherein the power take-off unit comprises: a pivot plate with a single-point coupling and an arcuate slot coupling, both for coupling to the vehicle chassis, wherein the pivot plate is rotatable about the single-point coupling around the arcuate slot coupling for aligning with the vehicle shaft, wherein the electric generator is attached to the pivot plate; an electric generator pulley coupled to the electric generator and supported by the pivot plate; a shaft pulley; a shaft attachment for attaching the shaft pulley to the vehicle shaft; a belt connecting the electric generator pulley and the shaft pulley.

In an embodiment, the energy harvesting device may comprise a photovoltaic solar panel array connected to the first DC bus through a DC/DC converter.

In an embodiment, the electric energy storage may be connected to the first DC bus through a DC/DC converter.

In an embodiment, the pivot plate support may comprise multiple arcuate slot couplings, in particular two arcuate slot couplings.

In an embodiment, the power take-off unit support may comprise two lateral supports attached to the pivot plate for supporting the electric generator pulley and the electric generator.

In an embodiment, the shaft attachment may be applied between an output flange of the gear box of the transport vehicle and the shaft flange of the vehicle shaft, or the shaft attachment may be attached to the vehicle shaft between the gear box and the central attachment of the vehicle shaft.

In an embodiment, a tensioner roll or pulley may be supported by the pivot plate and may be in tensioning contact with the belt.

In an embodiment, the first DC bus may have a voltage range from 100V to 350V and the second DC bus may have a voltage range from 650V to 720V.

In an embodiment, the photovoltaic array may be located on the vehicle roof.

In an embodiment, the electric generator axis may be parallel to the vehicle shaft.

In an embodiment, the shaft attachment may comprise a bushing for adjusting the system to different vehicle shaft diameters.

In an embodiment, the electronic brake controller may be configured for adjusting the power supplied to the first DC bus and the vehicle braking power applied through the power take off unit by the generator.

In an embodiment, the inverter output may be connected to a plug-in socket.

In an embodiment, the inverter output may have a voltage range from 380V to 400V, in particular the inverter output may be 380V or 400V, or 50 Hz or 60 Hz.

In an embodiment, the generator may be a permanent magnet synchronous motor configured as an electric generator, or the generator may be an induction motor configured as an electric generator.

The present disclosure also relates to a vehicle comprising the energy harvesting device previously described.

Furthermore, the present disclosure also relates to a method of retrofitting a transport vehicle with a driveline shaft comprising the appliance of the energy harvesting device mow disclosed.

BRIEF DESCRIPTION OF THE DRAWINGS

The following figures provide preferred embodiments for the present disclosure and should not be seen as limiting the scope of the disclosure.

DETAILED DESCRIPTION

Rigid body trucks, namely with refrigerated body (32), present a similar powertrain from fabricant to fabricant.

In this sense, to implement the energy recovery braking system (ERBS) (2), it is necessary to transfer the movement from the wheels to the electric generator (11). The kinetic power is possible to be extracted from the vehicle powertrain, as represented in FIG. 2.

Figure 1:
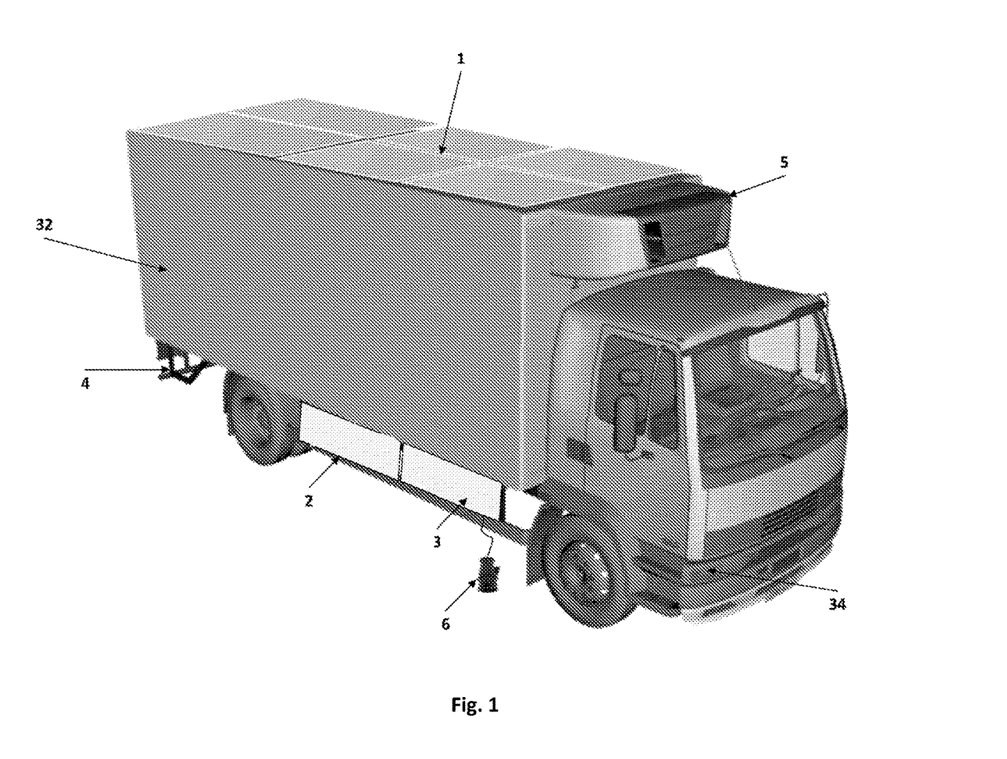
FIG. 1: Schematic drawing of an exemplary vehicle according to an embodiment of the present disclosure.
Figure 2:
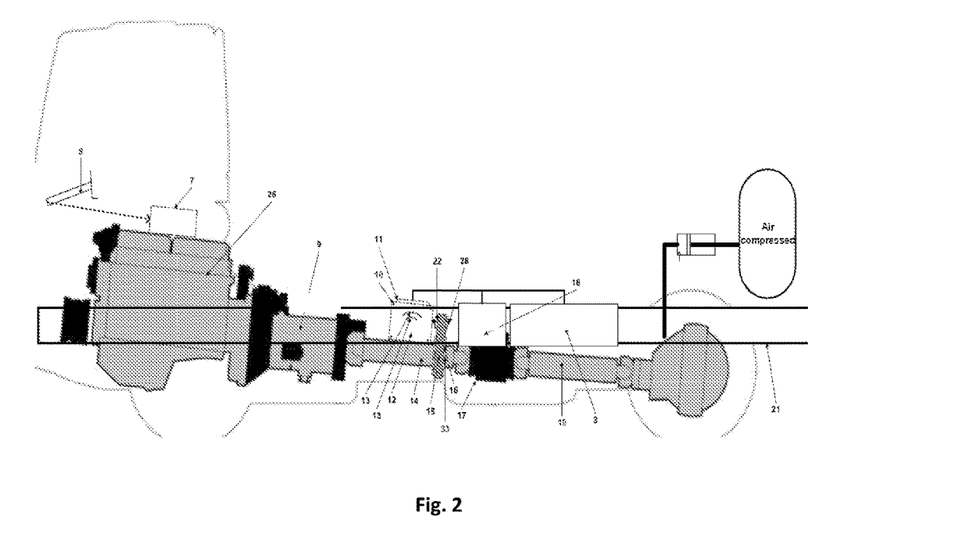
FIG. 2: Schematic drawing of an exemplary embodiment of the present disclosure in the vehicle shaft, side view.

In FIG. 2 are listed the possibilities for movement capture.

The shaft (14), which establishes connection between the gear box (9) and the central attachment (17), is a fixed shaft (14) since it does not follow the movement of the vehicle suspension and it is placed high enough from ground to protect the electric generator (11).

The existence of this type of shaft is common among all rigid body vehicles, having differences only in the shaft diameter. This location presents a reasonable working area and, in addition, it is easily accessible, which simplifies the packaging of the ERBS (2) components. The shaft (14) is quick to disassemble, requiring only intervention in the central attachment (17, 23) of shafts (14) and (19).

With this analysis, the location that gathers the conditions for caption and torque transmission to the wheels is located in the shaft (14).

Considering that normally the shaft (14) cannot (or should not) be cut, soldered, drilled or machined, the solution is to couple the mechanism (10, 15, 16, 20, 22, 27, 28), to the shaft (14), guarantying that the tightening torque does not cause its crushing.

The solution is constituted by a pulley (22, 33) and a belt (15) system. This solution is an effective way of power transmission, it is especially suited in high speed and in high variations of speed, it does not require lubrication and it is of easy maintenance, providing therefore an economical solution.

A tensioner roll or pulley (27) may be provided as an adjustable guide roll or pulley which stretches the belt (15) so that the belt (15) and pulleys (23, 33) can achieve their purpose.

That said, and as it is possible to observe in FIG. 2, there are presented the general aspects of this application and intervention:

Application of a synchronous toothed pulley (22, 33) in the shaft (14), through a shaft attachment system (16), tightening it against the shaft (14) itself. As vehicles present shafts with different diameters, it is placed a bushing (16) between the shaft (14) and the attachment ring, in order to adjust the system to different shafts.

Mounting of the of the electric generator (11) support (FIG. 5) in the stringers of the rear vehicle chassis (21), with adjustment to the standard drills, keeps the generator shaft (28) parallel to the vehicle shaft (14).

Figure 5:
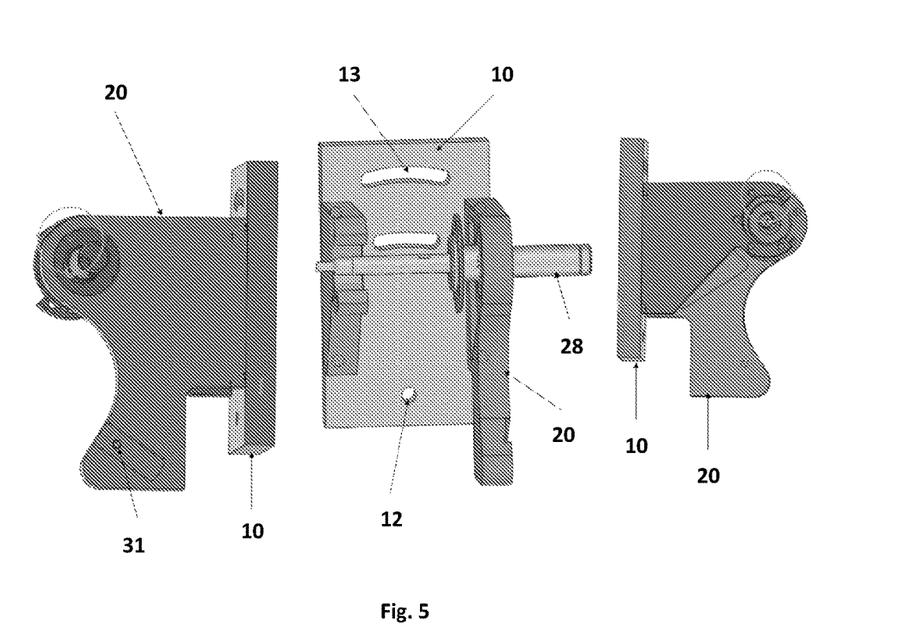
FIG. 5: Schematic drawing of a support plate of the generator which is attached to the vehicle chassis standard drills.

To keep the electric generator (11) parallel to the truck shaft (14), the pivot plate (10) of this support presents a particularity which allows some adjustments;

Disassemble of the central attachment (17) to enable the entrance of the shaft pulley (33) and attachment system (16) till the area of application in the shaft (14).

This coupling system contemplates three functions. One of them is the fact it is possible to decouple the electric generator (11) from the shaft (14) when necessary. To make it possible, it is simply needed to disengage the belt (15) from the generator pulley (22) or from the shaft pulley (33). Another advantage is the fact of being possible to establish a transmission relation between the electric generator (11) and the vehicle shaft (14), considering a relation between the teeth number of the pulleys (22, 33). This way it is possible to project a transmission relation of the system for an optimum rotation (i.e. functioning) regime of the electric generator (11) in function of the vehicle shaft (14) rotation range. Finally, the third advantage of the coupling system, is the possibility to adjust the location of the pulley along the vehicle shaft (14), this because, as closer to the central shaft support (23), or to the gear box (9), less are the vibrations produced during braking.

FIG. 5 presents the drawing of the electric generator pivot plate (10) which is tightened to the standard drills of the vehicle chassis (21).

FIGS. 2, 3, 4 and 7 present the electric generator pivot plate (10) assembled with the side supports (20).

Figure 3:
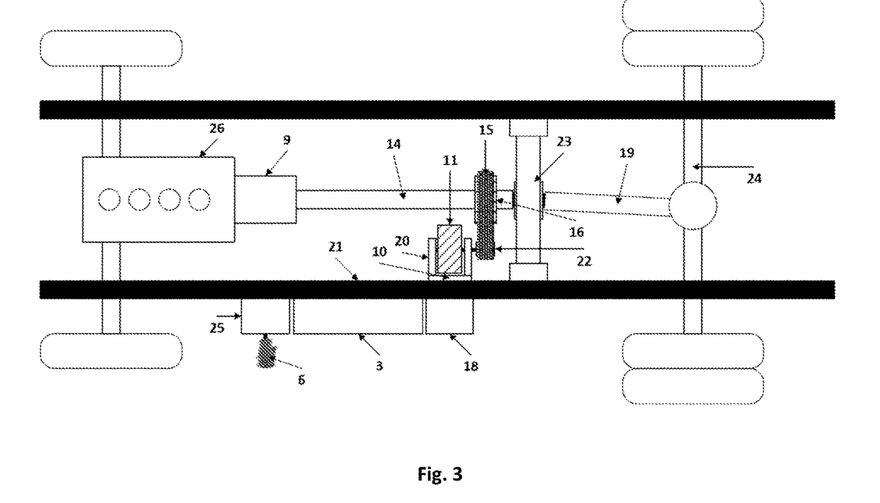
FIG. 3: Schematic drawing of an exemplary embodiment of the present disclosure in the vehicle shaft, top view.
Figure 4:
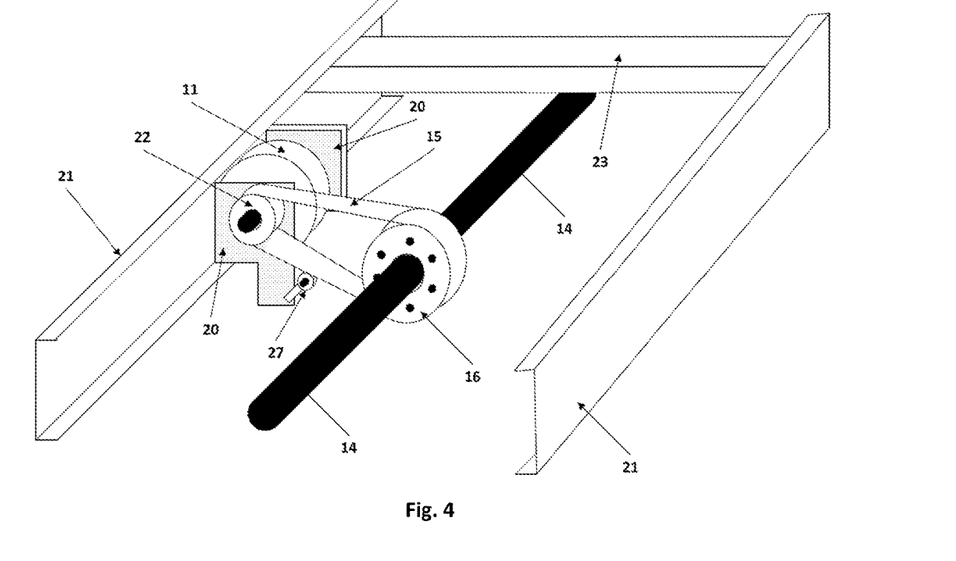
FIG. 4: Schematic drawing of an exemplary embodiment of the present disclosure in the vehicle shaft, front view.

This support (20) is applied in the vehicle chassis (21) as it is illustrated in FIGS. 2, 3 and 4.

To contemplate this integration in the vehicle, it was developed a controller (18) which allows the hybridization of the vehicle braking system. Once established the coupling, the electric generator (11) presents a level of rotation superior to the vehicle shaft (14), resulting from the transmission ratio imposed by the pulleys (22, 33) diameters.

The conversion of kinetic energy into electric energy is ensured by the controller (18) developed.

The control strategy for this hybrid braking system determines the distribution of torques between the two subsystems, mechanical (already existent) and the electric (installed) ERBS (2), according to the specifications and aims of the control. This way, another aim is to improve the performance and response of the braking system in dynamic regimes, maximizing the energy recovered and, simultaneously, satisfying other restrictions, as for example, the state of charge (SOC) of the storage system and the vehicle stability.

The performance of the controller (18) estimates the torque to apply, considering the position of the brake pedal (8), the angular speed of the wheel, the angular speed of the vehicle shaft (14) and the state of charge of the ultra-capacitors, also named super-capacitors bank, and electrochemical battery (3).

This way, and according to these conditions, the controller (18) controls the electric generator (11) (in torque) and consequently the energy produced as well as the braking.

This application does not interfere with the security system implemented as standard in trucks, since this system controls the pressure to be applied in the brake disks in each wheel. As the regenerative braking is done in the vehicle shaft (14), the truck braking system recalculates the pressure for braking.

The actuation of the ERBS (2) preferably has to take into account the variation of the brake pedal (8) position across the time (Brake Signal).

In fact, this condition is crucial to identify situations of hard braking and/or emergency braking which could damage the system, affect the braking dynamics and the vehicle stability itself. It is important to refer that in these conditions preferably only the vehicle mechanical brake system is operated.

Other preferable particularity is the intelligence to learn the behaviour of the driver and adapt the parameters to maximize energy recovery. And also the intelligence to decide whether or not energy is recovered driving on roads or highways with short duration descending slopes.

Another consideration is the SOC of the ultra-capacitor bank (3), this because of the current and consequently the energy produced by the electric generator (11) during braking, is proportional to the braking power produced. As a result, it is advantageous to know the capacity of the storage system (3) in real time to absorb the produced energy. On the other hand, and being the ultra-capacitor bank (3) totally charged, the electric generator (11) can only produce a braking power that does not generate a level of current higher than the limits of the electrochemical battery (3) during charging, ensuring that batteries are not damaged. Considering this, the torque value is updated accordingly to the variable state, in order to produce a power braking in the range which do not overloads the electrochemical battery (3). In these situations, to produce more braking power with less current to the batteries, advanced control algorithms are applied to dissipate energy through heat and magnetic losses.

To ensure a braking power range during seconds it is necessary to switch the energy between sources (1, 11, 2, 3) and loads (6, 5, 4, 34) in a synchronized way avoiding instabilities in the system. This way, there are used several DC/DC converters (29, 30) which operate in an interleaved way.

Figure 6:
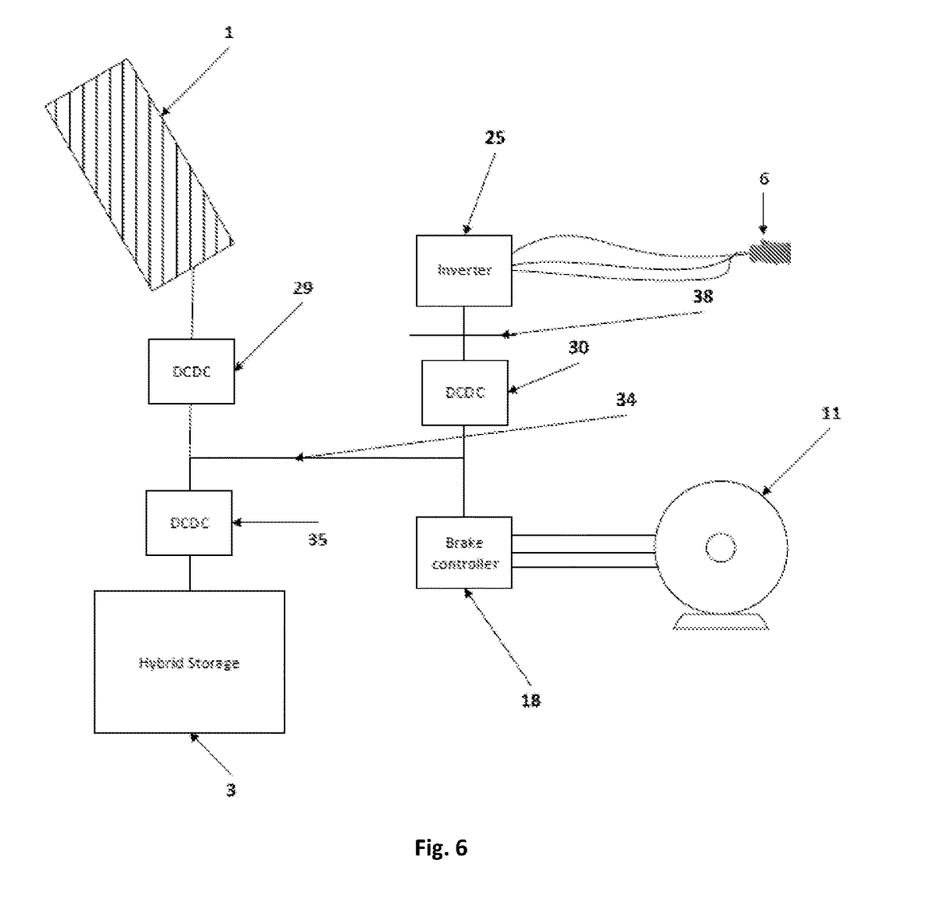
FIG. 6: Schematic drawing of the electric system architecture for high power loads.

As it is presented in FIG. 6, an embodiment of the system is comprised by 3 DC/DC (29, 30, 35) converters and 1 DC/AC converter (25). As the power involved in the braking is extremely high, the converter (30) is preferably constituted by 2 converters. The advantage is that the converter (30) is interleaved which reduces the current and voltage ripple, creating less instability, allowing lighter and smaller components.

In this approach, it is established a control strategy in order to store the maximum of energy recovered during braking. To achieve this, an algorithm may be used which ensures the discharge of the ultra-capacitor bank to the batteries (3), so these can be prepared to receive the energy peaks of a new braking.

Each subsystem has as function the stabilization of the voltage, downstream of its converter, of the DC bus (34) and the regulation of the input power, to increase the utilization of the energy.

At least one have to be used to steady the DC bus (34) voltage, and the others can contribute to the control of the energy flux by regulating the input currents. The DC bus (34) can be controlled either by brake controller (18) itself, regulating the electrochemical battery charge, or by the optional DC/DC (35) which allows to have the hybrid storage at different voltage levels.

The control of the system in an integrated way presents more advantages over a conventional distributed system: firstly because the reference values of the control variables can be provided for individual control, without delay or error propagation; secondly because, it is more effective in application to state transitions.

An embodiment of the disclosure has 2 DC bus with different voltage ranges.

The first DC bus (34) has a voltage range from 100V to 350V. From the technical point of view the first DC bus (34) plays 3 roles. The first one is the flexibility of having a DC bus voltage adaptable to the generator speed. The generator can be a permanent magnet synchronous motor (PMSM). The PMSM has an internal back EMF voltage that is directly proportional to the electric generator (11) speed, which means that to allow a higher speed of the electric generator (11), the DC bus voltage has to be increased. If the electric generator (11) is directly connected to the batteries, the speed is then limited by the actual voltage of the electrochemical battery which consequently decreases with the SOC. The second one is the possibility of having a hybrid storage system with both batteries and a super-capacitor bank (3), with the first DC bus (34) able to control the energy flux from the electric generator (11). The higher amounts of energy are collected to the super-capacitor bank and transferred to the electrochemical battery. The third role of the first DC bus (34) is to allow the voltage step-up to the second DC bus (38). With the use of the second DC bus (38) it is possible to achieve a 700V DC bus without the use of a transformer. The voltage is step-up from the electrochemical battery to the voltage level of the DC bus (34), and then step-up from the intermediate to the higher voltage DC bus.

The second DC bus (38) has a voltage range from 650V to 720V. From the technical point of view, the second DC bus (38) it plays 2 roles. The first role is to provide a voltage level that allows to create a 380V-400V 3-phase loads system through an inverter (25). The second role is to add flexibility and modularity for different kinds of AC loads. With the same DC bus (38) it is possible to connect inverts to supply several loads with different characteristics independently.

Therefore, the disclosed device has the advantage to manage the energy inputs among the several sources (1, 2, 3), turns on and off the energy sources (photovoltaic panels (1) and ERBS (2)) having into account the energy flux required and the implementation of a distributed architecture for the photovoltaic panels (1) that allows to connect them individually and automatically.

Furthermore, it is possible to adapt automatically several voltage levels among the several sources.

To conclude, preferably the system is fully able to be integrated with fleet management systems, to monitor the energy production and to adapt the energy production considering geographical location and route.

One of the alternatives to the coupling of the shaft pulley (33) to the shaft (14) could be by cutting it. Since these shafts are hollow, it could be possible to apply the pulley in a shaft with a diameter inferior to the internal diameter of the vehicle shaft (14), so this could connect the two halves.

Figure 7:
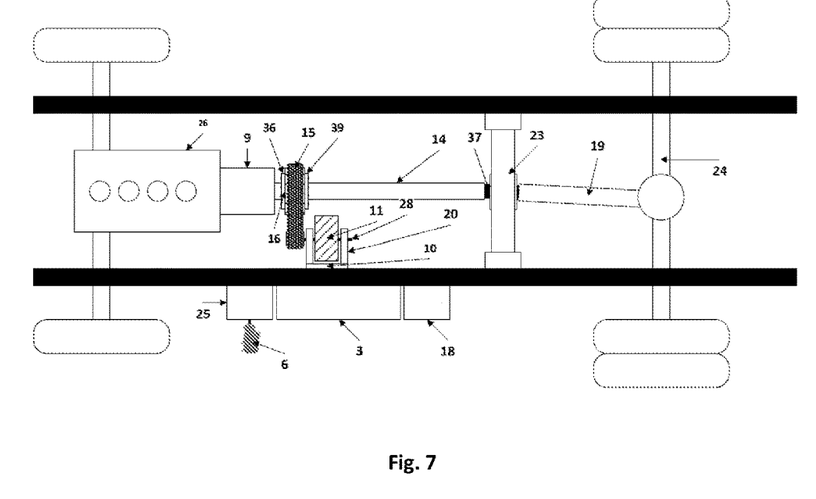
FIG. 7: Schematic drawing of an exemplary alternative application of the system in the vehicle shaft, applying the pulley between the output flange of the gear box and the shaft flange.

Another alternative would be applying the shaft pulley (33) between the output flange (36) of the gear box (9) and the shaft flange (39), as it is evidenced in FIG. 7. Depending on the pulley (33) thickness, as the shaft presents a compression mechanism (37), in many cases it would not be required to cut the shaft (14) to adjust the length to the thickness of the shaft pulley (33).

A third option would be cutting the shaft (14) in two halves, and then applying the flanges (28, 36) in the cut ends and consequently tightening the pulley (33) between the two flanges (28, 36).

One of the aspects which distinguishes the disclosure is the integration of better energy sources which maximize the vehicle potential to produce its own energy, based on a process of energy harvesting. On the other hand, this system can be installed in any vehicle already in circulation, or in production through a very quick and simple installation.

The disclosure provides a non-invasive and portable solution.

Comparing the ERBS (2) with the auxiliary braking systems of trucks in circulation, for instance the Retarder, Intarder (auxiliary mechanical braking systems, e.g. hydraulic) and Telma (electromagnetic retarder), the ERBS (2), besides being lighter, it recovers energy during braking. While Telma (normally called electric brake) can weigh between 600 kg and 1 tone, and during braking dissipates energy through Foucault currents generation prompting truck battery discharge to produce the magnetic field, the present system on the other hand charges the battery assisting simultaneously the braking.

One other advantage is the fact of managing 3 energy sources simultaneously aiming to maximize the production, recovery and storage to provide the maximum of energy to the refrigeration systems and other loads. It is also possible to supply energy directly to the electric power grid or then for auto consumption in logistics warehouses.

Having an intermediate DC bus (34) connected to the regenerative brake controller (18) before the DC/DC (30) allows to reduce the weight and size of the DC/DC converter components adding more flexibility at the same time.

As the controller (18) manages the torque of an electric generator (11), it is also possible to control the energy harvested from a wind turbine or other primary rotating sources.

The application of the ERBS (2) with the mechanical coupling method detailed above, does not interfere with the safety of the vehicle braking system, does not require modifications in the chassis or transmission chain, does not introduces instability and moreover it presents a level of modularity which allows its application in trucks of different manufacturers.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. An energy harvesting device for a transport vehicle with a driveline shaft comprising:
   an electric converter circuit, wherein the electric converter circuit comprises:
      an electric energy storage comprising an electrochemical battery and a super-capacitor bank,
      a first DC bus,
      an electronic brake controller,
      an electric generator connected to the first DC bus, through the electronic brake controller,
      a second DC bus connected to the first DC bus through a DC/DC converter, wherein the first DC bus has a first voltage is lower than a second voltage of the second DC bus, and
      an inverter, wherein an input of the inverter is connected to the second DC bus and an output of the inverter is connected to an electrical load of the energy harvesting device; and
   a power take-off unit, wherein the power take-off unit comprises:
      a pivot plate with a single-point coupling and an arcuate slot coupling, both for coupling to the vehicle chassis, wherein the pivot plate is rotatable about the single-point coupling around the arcuate slot coupling for aligning with the vehicle driveline shaft, wherein the electric generator is attached to the pivot plate,
      an electric generator pulley coupled to the electric generator and supported by the pivot plates,
      a shaft pulley,
      a shaft attachment for attaching the shaft pulley to the vehicle driveline shaft, and
      a belt connecting the electric generator pulley and the shaft pulley.

2. The energy harvesting device according to claim 1, further comprising: a photovoltaic solar panel array and a DC/DC converter for the photovoltaic solar panel array, wherein the photovoltaic solar panel array is connected to the first DC bus through the DC/DC converter.

3. The energy harvesting device according to claim 1, further comprising: a DC/DC converter for the electric energy storage wherein the electric energy storage is connected to the first DC bus through a DC/DC converter.

4. The energy harvesting device according to claim 1, wherein the pivot plate support comprises multiple arcuate slot couplings for coupling to the vehicle chassis.

5. The energy harvesting device according to claim 1, wherein the power take-off unit support comprises two lateral supports attached to the pivot plate for supporting the electric generator pulley and the electric generator.

6. The energy harvesting device according to claim 1, wherein the shaft attachment is either: applied between an output flange of a gear box of the transport vehicle and a shaft flange of the vehicle driveline shaft, or the shaft attachment is attached to the vehicle driveline shaft between the gear box and a central attachment of the vehicle driveline shaft.

7. The energy harvesting device according to claim 1, wherein at least one of a tensioner roll and a pulley is supported by the pivot plate and is in tensioning contact with the belt.

8. The energy harvesting device according to claim 1, wherein the first voltage of the first DC bus has a voltage range from 100V to 350V and the second voltage of the second DC bus has a voltage range from 650V to 720V.

9. The energy harvesting device according to claim 2, wherein the photovoltaic array is suitable to be located on a roof of the vehicle.

10. The energy harvesting device according to claim 1, wherein the power take-off unit is adapted such that an axis of the electric generator can be positioned parallel to the vehicle driveline shaft when the energy harvesting device is mounted on the vehicle.

11. The energy harvesting device according to claim 1, wherein the shaft attachment comprises a bushing for adjusting the power take off unit to different vehicle driveline shaft diameters.

12. The energy harvesting device according to claim 1, wherein the electronic brake controller is configured for adjusting an amount of power supplied to the first DC bus and an amount of vehicle braking power applied through the power take off unit by the generator.

13. The energy harvesting device according to claim 1, wherein the inverter output is connected to a plug-in socket.

14. The energy harvesting device according to claim 1, wherein the inverter output has a voltage range from 380V to 400V.

15. The energy harvesting device according to claim 1, wherein the inverter output is 380V or 400V.

16. The energy harvesting device according to claim 1, wherein the generator is either a permanent magnet synchronous motor configured as an electric generator, or the generator is an induction motor configured as an electric generator.

17. A vehicle, comprising:
a vehicle chassis;
a drive shaft;
an energy harvesting device attached to the drive shaft, wherein the energy harvesting device comprises:
an electric converter circuit, wherein the electric converter circuit comprises:
an electric energy storage comprising an electrochemical battery and a super-capacitor bank,
a first DC bus,
an electronic brake controller,
an electric generator connected to the first DC bus through the electronic brake controller,
a second DC bus connected to the first DC bus through a DC/DC converter, wherein the first DC bus has a first voltage is lower than a second voltage of the second DC bus, and
an inverter, wherein an input of the inverter is connected to the second DC bus and an output of the inverter is connected to an electrical load of the energy harvesting device
a power take-off unit, wherein the power take-off unit comprises:
a pivot plate with a single-point coupling and an arcuate slot coupling both for coupling to the vehicle chassis, wherein the pivot plate is rotatable about the single-point coupling around the arcuate slot coupling for aligning with the vehicle driveline shaft, wherein the electric generator is attached to the pivot plate,
an electric generator pulley coupled to the electric generator and supported by the pivot plate,
a shaft pulley,
a shaft attachment for attaching the shaft pulley to the vehicle driveline shaft, and
a belt connecting the electric generator pulley and the shaft pulley.

18. A method of retrofitting a transport vehicle with a driveline shaft, comprising:
disconnecting an end of the vehicle driveline shaft;
attaching an energy harvesting device to vehicle, the energy harvesting device comprising:
an electric converter circuit, wherein the electric converter circuit comprises:
an electric energy storage comprising an electrochemical battery and a super-capacitor bank,
a first DC bus,
an electronic brake controller,
an electric generator connected to the first DC bus, through the electronic brake controller,
a second DC bus connected to the first DC: bus through a DC/DC converter, wherein the first DC bus has a first voltage is lower than a second voltage of the second DC bus, and
an inverter, wherein an input of the inverter is connected to the second DC bus and an output of the inverter is connected to an electrical load of the energy harvesting device; and
a power take-off unit, wherein the power lake-off unit comprises:
a pivot plate with a single-point coupling and an arcuate slot coupling, both for coupling to the vehicle chassis, wherein the pivot plate is rotatable about the single-point coupling around the arcuate slot coupling for aligning with the vehicle driveline shaft, wherein the electric generator is attached to the pivot plate,
an electric generator pulley coupled to the electric generator and supported by the pivot plate,
a shaft pulley,
a shaft attachment for attaching the shaft pulley to the vehicle driveline shaft, and
a belt connecting the electric generator pulley and the shaft pulley;
wherein the step of attaching the energy harvesting device to the vehicle comprises:
coupling the pivot plate to the vehicle chassis, and
attaching the shaft pulley to the vehicle driveline shaft; and
reconnecting the vehicle driveline shaft.

* * * * *